United States Patent
Golparian

(10) Patent No.: US 8,130,590 B2
(45) Date of Patent: Mar. 6, 2012

(54) WIRELESSLY ACTIVATING A UNIT OF A SUBTERRANEAN SURVEY SYSTEM FOR TESTING

(75) Inventor: Daniel H. Golparian, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 248 days.

(21) Appl. No.: 12/255,706

(22) Filed: Oct. 22, 2008

(65) Prior Publication Data

US 2010/0097884 A1 Apr. 22, 2010

(51) Int. Cl.
*G01V 1/22* (2006.01)
(52) U.S. Cl. .......................... 367/13; 367/77; 340/10.33
(58) Field of Classification Search .................... 367/13, 367/77; 340/10.1, 10.31–10.34
See application file for complete search history.

(56) References Cited

U.S. PATENT DOCUMENTS

| | | | |
|---|---|---|---|
| 4,725,992 A * | 2/1988 | McNatt et al. | 367/77 |
| 7,298,671 B2 | 11/2007 | Brinkmann et al. | |
| 7,729,202 B2 * | 6/2010 | Eperjesi et al. | 367/77 |
| 2005/0246137 A1 | 11/2005 | Brinkman et al. | |
| 2007/0268114 A1* | 11/2007 | Enenkl | 340/10.1 |
| 2008/0136603 A1* | 6/2008 | Choi et al. | 340/10.33 |

* cited by examiner

*Primary Examiner* — Ian Lobo

(57) ABSTRACT

To test at least one unit of a subterranean survey system, the unit detects presence of wireless signaling of a mobile device. After the detecting, a wireless connection is established between the unit and the mobile device. A test at the unit is performed in response to a test command from the mobile device.

21 Claims, 4 Drawing Sheets

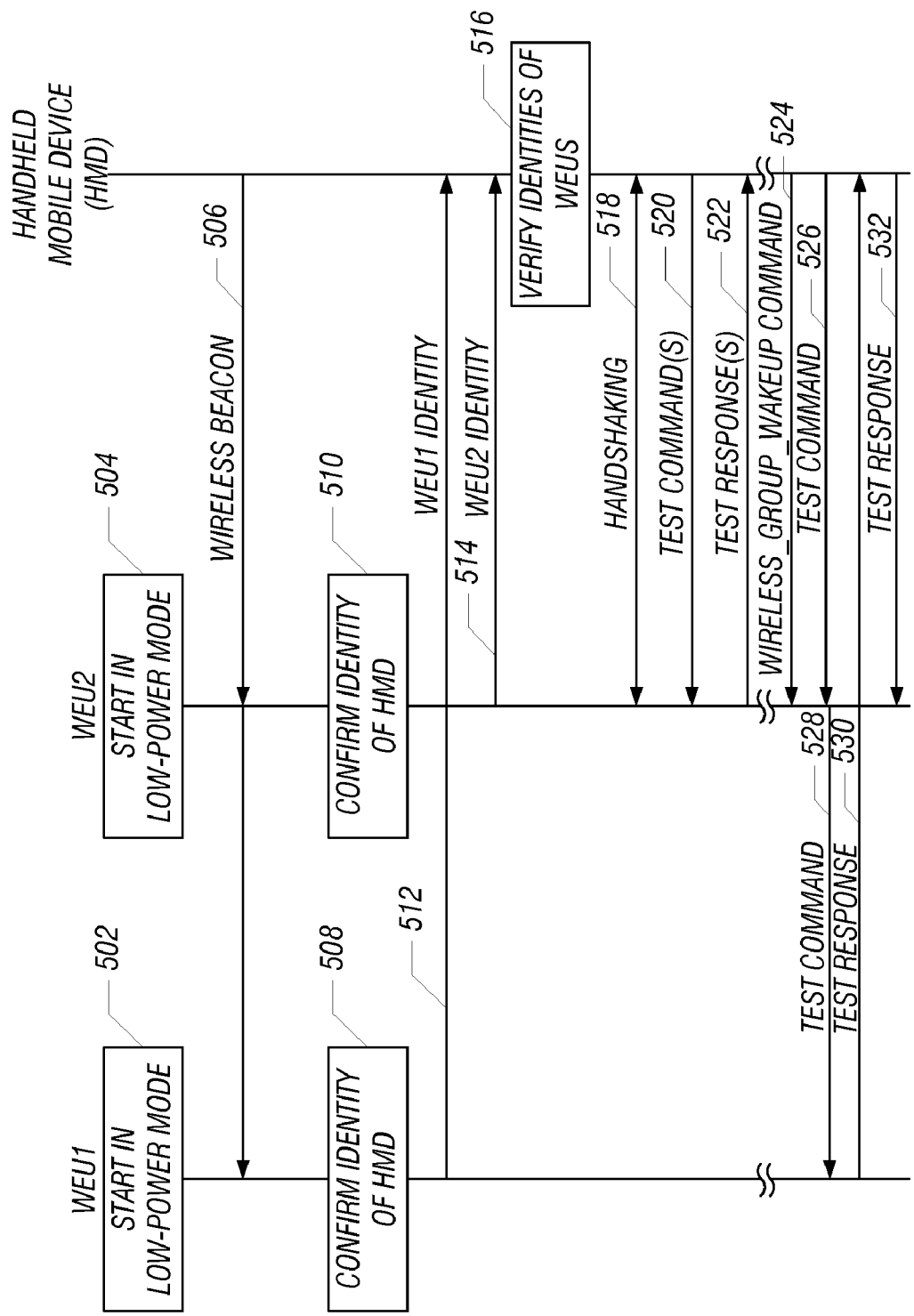

WIRELESSLY ACTIVATING A UNIT OF A SUBTERRANEAN SURVEY SYSTEM FOR TESTING

TECHNICAL FIELD

The invention relates to wirelessly activating a unit of a subterranean survey system for testing.

BACKGROUND

Surveying is used for identifying subterranean elements, such as hydrocarbon reservoirs, freshwater aquifers, gas injection reservoirs, and so forth. Surveying can include seismic surveying or electromagnetic (EM) surveying. In seismic surveying, seismic sources are placed in various locations above an earth surface or sea floor, with the seismic sources activated to generate seismic waves directed into the subterranean structure.

The seismic waves generated by a seismic source travel into the subterranean structure, with a portion of the seismic waves reflected back to the surface for receipt by seismic receivers (e.g., geophones, hydrophones, etc.). These seismic receivers produce signals that represent detected seismic waves. Signals from seismic receivers are processed to yield information about the content and characteristic of the subterranean structure.

EM surveying involves deployment of one or more EM sources that produce EM waves that are propagated into the subterranean structure. EM signals are affected by elements in the subterranean structure, and the affected signals are detected by EM receivers, which are then processed to yield information about the content and characteristic of the subterranean structure.

A survey system can include a number of different types of units, such as different types of concentrator units (which are basically routing or switch units to enable routing and switching of messages in the survey system). The logistics involved in physically laying out the different types of units and connecting them together, particularly in a large survey system that may have hundreds or thousands of units, can lead to increased cost associated with deployment of the survey system. Typically, once an entire survey system is laid out, the survey system is powered up and connected to a central recording system, such as a recording truck. The central recording system can then be used to test the entire system, which can be a relatively complex task. If failures are detected, the survey system attempts to generate diagnostics to identify the causes of the various failures and the units that are faulty. Maintenance crews can then be sent to remote locations to fix the identified problems. Example problems include faulty units, faulty cables, faulty connectors, and so forth.

Because of the inherent point-to-point connections between units of a survey system, multiple failures may often not be discovered together (because it is difficult to isolate the source of failure due to error accumulation), and several rounds of testing may have to be performed (with corresponding repairs) prior to successful setup of the survey system. Wasting time doing the several rounds of testing may be very costly for survey operations.

In survey systems deployed in remote or difficult to access environments, such as in the Arctic or other remote locations, repairing or replacing faulty components can be tedious, time consuming, and sometimes impossible. Also, it may be difficult to take cables apart to tab into the system for repair or replacement tasks. As a result, conventional techniques of deploying a survey system can be associated with relatively high costs and reduced reliability.

SUMMARY

In general, according to an embodiment, a method of activating a unit of a subterranean survey system for testing includes the unit detecting presence of wireless signaling of a mobile device. A wireless connection is then established between the unit and the mobile device, and a test is performed at the unit (or a segment connected to the unit) in response to a test command from the mobile device.

Other or alternative features will become apparent from the following description, from the drawings, and from the claims.

BRIEF DESCRIPTION OF THE DRAWINGS

FIG. 5 is a flow diagram of a procedure for setting up and testing a unit (or a group of units) of a survey system, according to an embodiment.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

In accordance with some embodiments, a technique or mechanism of testing at least one unit of a subterranean survey system involves the unit detecting for presence of wireless signaling of a mobile device, such as a handheld mobile device with wireless signaling capabilities. After detecting the presence of the wireless signaling of the mobile device, a wireless connection can be established between the unit of the survey system and the mobile device. Then, the unit can perform a test in response to a test command from the mobile device over the wireless connection. A test can include a self-test (where the unit runs a test procedure without further input from the mobile device. A self-test returns a status, for example. Alternatively, the test can be a test based on stimuli from the mobile device, in which case both status and data are returned.

Also, a technique is provided to wirelessly awaken a unit of the survey system after the unit has entered into a sleep state, or to place the unit into a sleep state.

Segments of the survey system can be tested before connecting the segments to the survey system (which can save time and money). Moreover, testing convenience is enhanced by using wireless signaling, which avoids having to connect cables. In addition, it is noted that even after the survey system has been interconnected, one or a few segments of the survey system can still be separately tested, such as to perform debugging or fault isolation.

Figure 1:
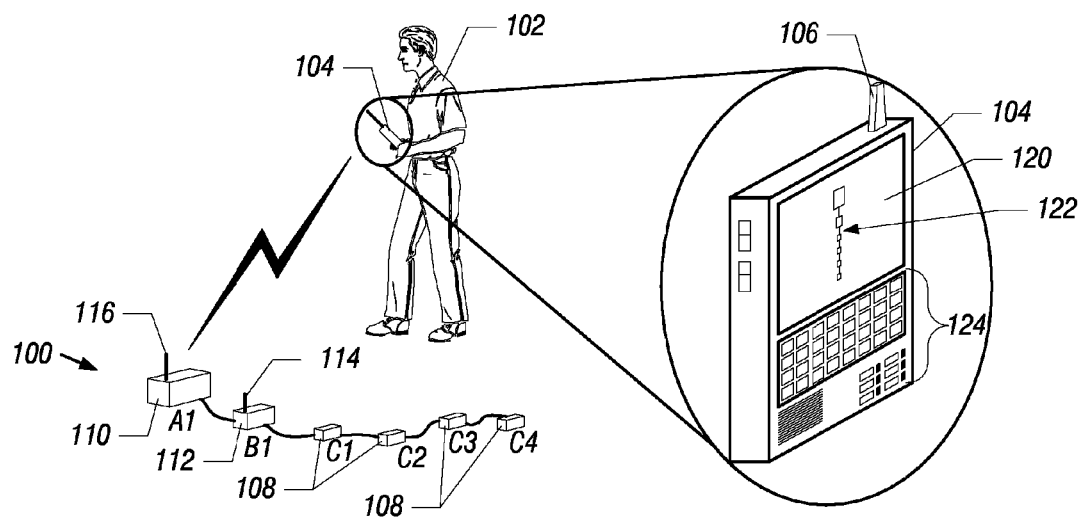
FIG. 1 is a block diagram of an example arrangement for performing wireless testing of a portion of a survey system, in accordance with an embodiment.

FIG. 1 illustrates an example arrangement in which a segment 100 of a survey system is tested using a technique according to an embodiment. A segment is a set of units connected together so that the units of the segment can be tested together. A user 102 carries a handheld mobile device 104 that has an antenna 106 for performing wireless communications with one or more of wireless equipped units (WEUs) of the survey system segment. A WEU includes a wireless interface used for testing, wakeup, or sleep tasks, as opposed to a wireless interface used just for data communication. In the example of FIG. 1, the survey system segment 100 shown includes survey sensors 108 and concentrator units 110 and 112. The survey sensors 108 can be seismic sensors or electromagnetic (EM) sensors. Examples of seismic sensors include geophones, hydrophones, accelerometers, and so forth. Examples of EM sensors include sensors that include elements for measuring magnetic and/or electric fields. The survey sensors are used to detect signals reflected from a subterranean structure in response to signals emitted by one or more survey sources.

The concentrator units 110 and 112 include communications elements for routing messages over a network of the survey system among different units of a survey system. The concentrator units 110 and 112 can be different types of concentrator units. For example, the concentrator unit 112 can be a higher bandwidth concentrator unit that is connected to other concentrator units. In contrast, the concentrator unit 110 is a lower bandwidth concentrator unit that is connected to survey sensors.

In the example depicted in FIG. 1, the concentrator units 110 and 112 each includes a corresponding antenna 114 and 116 to communicate wirelessly with the handheld mobile device 104. In other implementations, some of the survey sensors can also be provided with antennas to perform wireless communications. Any unit in the survey system that is able to communicate wirelessly is referred to as a "wireless equipped unit" (WEU). Wireless connectivity between the handheld mobile device 102 and the subterranean survey system segment 100 allows for relatively rapid testing of the subterranean survey system segment (or a unit).

One example type of wireless communication is radio frequency (RF) communication or other types of EM communications. Alternatively, the wireless communication can be infrared (IR) communication, acoustic communication, and so forth.

The units 108, 110, and 112 in the survey system segment 100 are interconnected by links, which can be optical links, electrically conductive links, or both. The link between the concentrator units 110 and 112 can be an optical link. On the other hand, the link between the concentrator unit 110 and the survey unit 108 can be an electrically conductive link, or a combination of an optical link and an electrically conductive link, or a wireless link.

As further depicted in FIG. 1, the handheld mobile device 104 has a display device 120 in which a graphical representation 122 of the survey system segment 100 is depicted. The graphical representation 122 includes graphical icons or elements corresponding to each of the units 118, 110, and 108. The representation 122 can be created due to the fact that each WEU after power up is capable of building a "topology map" of the units and segments that are connected to them. The protocol for building the topology involves communication among WEUs. Note that the handheld mobile device 104 can also include a predefined topology of the units. The predefined topology can be compared to the topology built up by the WEUs.

In addition, the handheld mobile device 104 also includes various user-actuatable keys and buttons 124, or some other type of user input device.

Note that the handheld mobile device 104 can be a personal digital assistant (PDA), a notebook computer, or some other type of mobile device with wireless communication capability.

In accordance with some embodiments, the user 102 can use the handheld mobile device 104 to perform testing of the survey system segment 100 prior to the survey system segment 100 being connected to the rest of the survey system. In this way, any problems, faults or other issues that may be present in the survey system segment 100 can be easily identified by the user 102, and repaired prior to deployment of the survey system segment 100. This reduces the likelihood that repair crews would have to be deployed to remote or difficult to access locations for the purpose of repairing some segment of the survey system.

Figure 2:
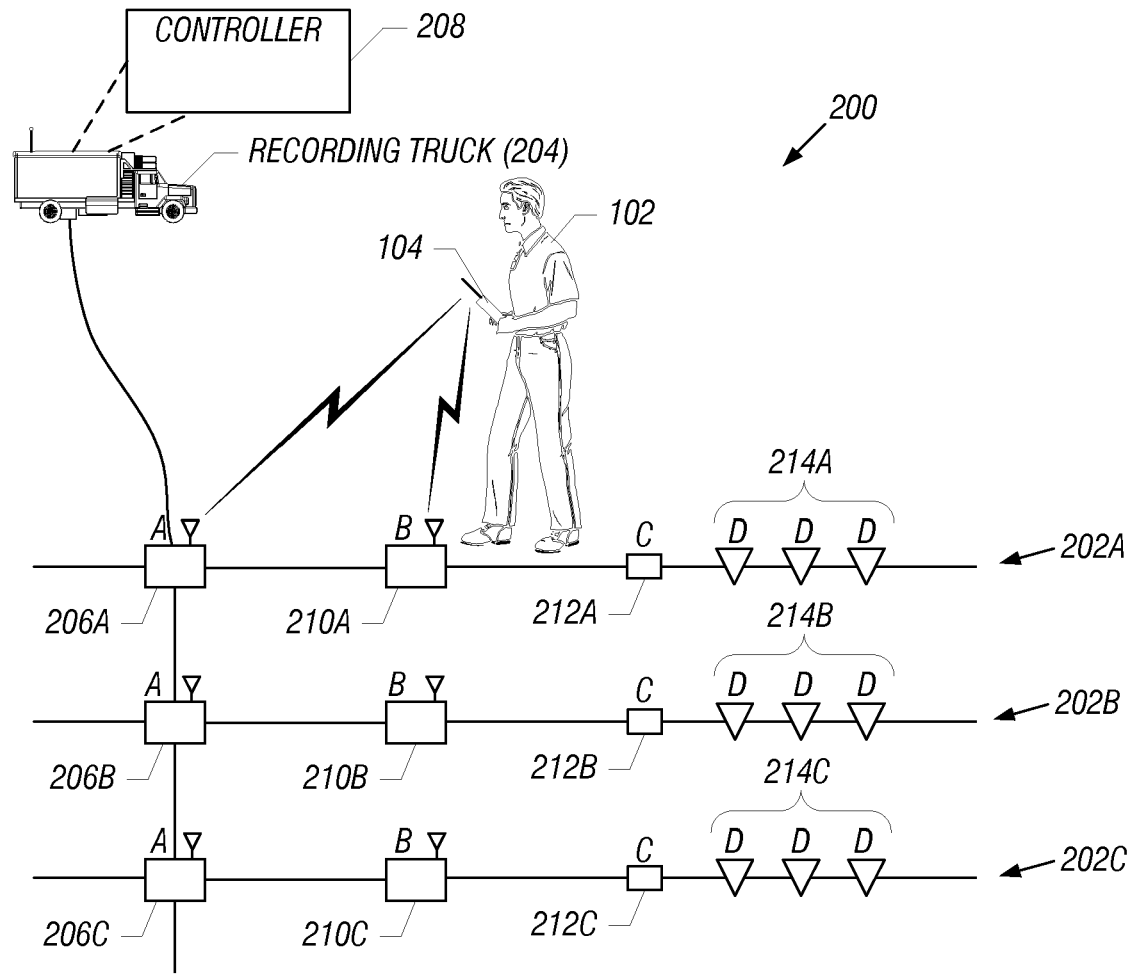
FIG. 2 is a block diagram of an example topology of a survey system in which some embodiments can be incorporated.

FIG. 2 shows an example survey system 200 that includes several segments 202A, 202B, and 202C (note that other segments of the survey system 200 are not depicted in FIG. 2). The handheld mobile device 104 was used by the user 102 to test each of the segments 202A, 202B, and 202C through respective connections (interconnecting the various units as depicted in FIG. 2) prior to deployment of such segments into the survey system 200. Each segment 202A, 202B, or 202C is similar to segment 100 depicted in FIG. 1.

Also depicted in FIG. 2 is a recording truck 204 that is connected to one or more concentrator units 206A, 206B, 206C of the survey system 200. The recording truck 204 includes a controller 208 that is able to communicate with units in the survey system 200. The recording truck 204 is able to receive and store measurement data measured by survey sensors. Also, the recording truck 204 is able to perform management tasks by sending commands over the network of concentrator units.

Each of the survey system segments 202A, 202B, 202C also includes additional concentrator units 210A, 210B, 210C, respectively, and 212A, 212B, 212C, respectively. The concentrator units 206 (206A-206C), 210 (210A-210C), and 212 (212A-212C) may be different types of concentrator units. Note that concentrator units 206 (206A-206C) and 210 (210A-210C) each has a corresponding antenna to enable wireless communication with the handheld mobile device 104. Thus, each of the units 206A-206C, 210A-210C is considered a WEU.

The WEUs in the survey system segment can be initially in a low-power mode, where at least some segments of each WEU are in a powered off state. When a WEU detects a wireless signal (e.g., wireless beacon) from the handheld mobile device, the WEU is able to awaken from the low-power mode and to transition to an active mode. In transitioning to the active mode, the WEU can perform association (where the WEU confirms with a neighboring WEU that it has established contact) and authentication (to positively identify a WEU to avoid intrusion). Once in the active mode, the WEU is able to respond to test commands from the handheld mobile device 104 to perform testing at the WEU.

Figure 3:
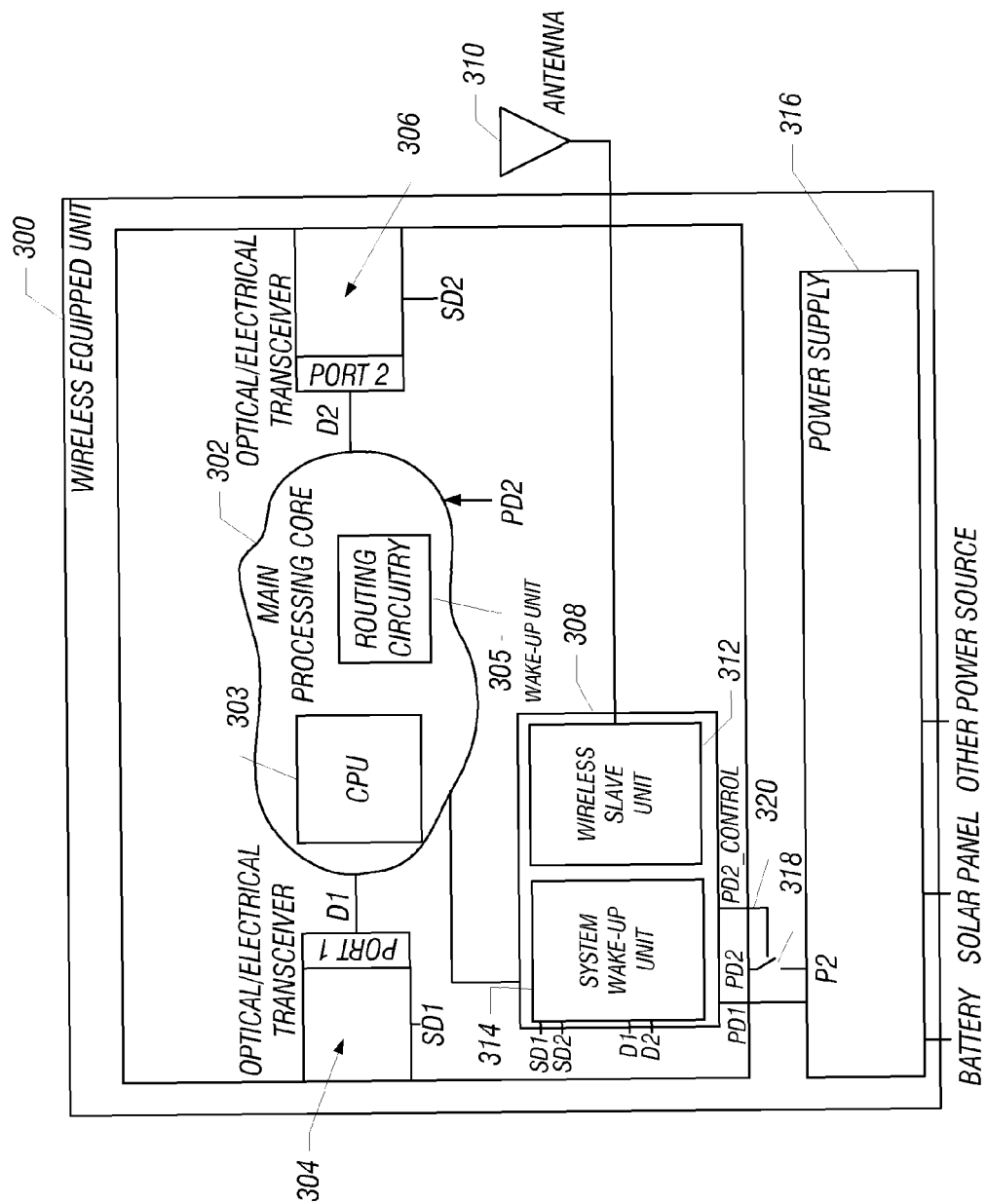
FIG. 3 is a block diagram of a wireless equipped unit in the survey system according to an embodiment.

FIG. 3 shows a block diagram of an example WEU 300 according to an embodiment. The WEU 300 (e.g., 210A-C or 206A-C) includes a main processing core 302 that is interconnected to first and second transceivers 304 and 306. For example, the main processing core 302 can receive data (e.g., D1) from the transceiver 304 and output data (D2) to the transceiver 306 (or vice versa). Each transceiver 304, 306 can be an optical transceiver, an electrical transceiver or both an optical and electrical transceiver. Each transceiver 304 or 306 includes a corresponding transmitter and a receiver. The transceivers 304, 306 are used to communicate over corresponding communication links that are part of the network of the survey system, where the communication links can be optical links and/or electrical links.

The main processing core 302 includes a central processing unit (CPU) 303, which can be implemented with a microprocessor, microcontroller, and so forth. The main processing core 302 can also include other components, such as a timer and a real-time clock (RTC) (not shown). The main processing core 302 also includes routing circuitry for routing packets to other units.

The WEU 300 also includes a wakeup unit 308 that is able to detect wireless signaling from a handheld mobile device 104, such as a wireless beacon from the handheld mobile device 104. The wakeup unit 308 can also communicate data with the handheld mobile device 104. A wireless slave unit 312 in the wakeup unit 308 is connected to an antenna 310 for performing wireless communication with the handheld mobile device 104. The wireless slave unit 312 can detect the wireless beacon from the handheld mobile device 104. The wakeup unit 308 also includes a system wakeup unit 314 that controls powering up of components of the WEU 300.

The WEU 300 also includes a power supply 316 that is able to receive power from one or more power sources, such as a battery, solar panel, or other power source. The power supply 316 outputs at least two power supply voltages, which in the example of FIG. 3 are PD1 and P2. The power supply voltage PD1 is connected to the wakeup unit 308.

The power supply output P2 from the power supply 316 is connected to one side of a power switch 318, which when opened isolates the power supply output P2 from a power supply voltage PD2. In other words, if the power switch 318 is open, the power supply voltage PD2 is off. However, when the power switch 318 is closed, under control of a control signal 320 from the system wakeup unit 314 in the wakeup unit 308, the PD2 power supply voltage is connected to the power supply output P2, such that PD2 is driven to the voltage level of P2.

The power supply voltage PD2 is connected to the transceivers 304, 306, as well as to the main processing core 302 that includes the CPU 303 and the routing circuitry 305. Thus, while the power switch 318 is open, the transceivers 304, 306 and the main processing core 302 are powered off.

In the case where an additional mechanism for waking up the unit based on its optical/copper connection is provided, the data from the transceivers 304 and 306 are also fed to the system wakeup unit 314.

The main power switch 318 being open corresponds to the low-power mode of the WEU 300, since most of the components of the WEU 300 are powered off. In the low-power mode, the wakeup unit 308 remains powered on by PD1 to enable receipt and detection of wireless signaling from the handheld mobile device. However, once the power switch 318 is closed, then power is provided to the main processing core 302 as well as to the transceivers 304, 306, which corresponds to the active mode of the WEU 300. The system wakeup unit 314 causes the switch 318 to close in response to the wireless slave unit 312 detecting the wireless beacon of the handheld mobile device 104.

Effectively, two power domains are present in the WEU 300: a first power domain that is powered by power supply voltage PD1, and a second power domain that is powered by power supply voltage PD2. The first power domain includes the wakeup unit 308. The second power domain includes the main processing core 302 and the transceivers 304, 306. Note that other components (not shown) can also be part of the first or second power domain.

Optionally, when optical transceivers are used, signals SD1 and SD2 are also provided from the transceivers 304, 306 to the wakeup unit 308. The signals SD1 and SD2 can indicate that signaling activity on respective communication links (e.g., electrical links or optical links) have been detected by corresponding receivers in the transceivers 304, 306. Such detected activities, as indicated by SD1 and/or SD2, can be used by the wakeup unit 308 to awaken the WEU 300. Alternatively, when electrical transceivers are used, an alternate mechanism can be used to detect electrical signals. To enable detection of signaling activity on a communication link connected to a transceiver 304 or 306, the receiver in the transceiver is powered by PD1, which is active in the low-power mode (note that the transmitter in the transceiver would continue to be powered by PD2, which is off in the low-power mode).

Figure 4:
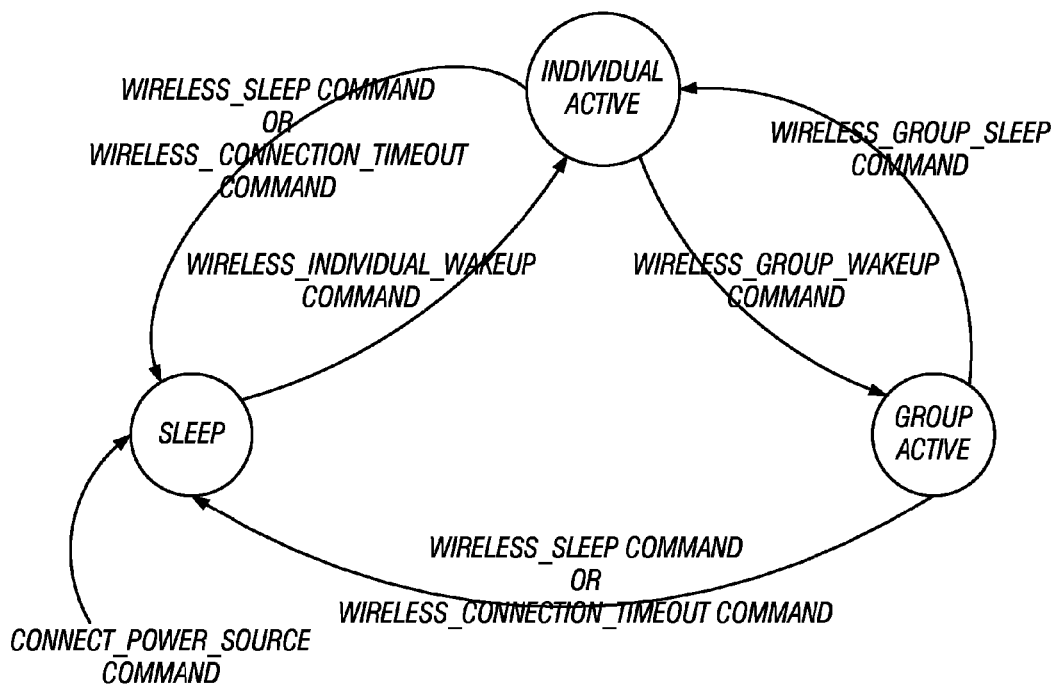
FIG. 4 is a state diagram showing states to which the wireless equipped unit can transition.

FIG. 4 shows a state diagram of the various possible states of the WEU 300. A "sleep" state corresponds to the low-power mode of the WEU 300. When power is initially connected to the WEU 300 (as indicated by a Connect_Power_Source command), the WEU 300 powers up in the low-power mode (the sleep state of FIG. 4).

The WEU 300 can have two types of active modes: an individual active state or a group active state. An individual active state corresponds to the active mode of the WEU 300 where the WEU 300 is being tested without testing other units coupled to the WEU 300 in the survey system segment (e.g., testing each of the 206A-206C or 210A-210C WEUs of FIG. 2 individually). On the other hand, the group active state corresponds to the active mode of the WEU 300 where the WEU 300 is being tested along with at least one other unit coupled to the WEU 300 in the survey system segment (e.g., testing segments 202A, 202B, or 202C in FIG. 2 along with the WEUs connected to them).

The transition from the sleep state to the individual active state occurs in response to a Wireless_Individual_Wakeup command received by the WEU 300 from the handheld mobile device 104. The Wireless_Individual_Wakeup command is a command sent by the handheld mobile device 104 to the WEU 300 over a wireless connection to cause the WEU 300 to enter a state where the WEU 300 is to be individually tested. While in the individual active state, the WEU 300 is able to respond to one or more test commands to perform testing of the WEU 300.

From the individual active state, the WEU 300 can transition to the group active state in response to a Wireless_Group_Wakeup command. Upon this transition, the WLU 300 (unit under test) can wake up the unit or the segment connected to it, and so forth. The Wireless_Group_Wakeup command is sent by the handheld mobile device 104 to the WEU 300 over a wireless connection to cause the WEU 300 to enter a state where the WEU 300 is able to be tested along with at least one other unit of the survey system coupled to the WEU 300. While in the group active state, the WEU 300 is able to respond to one or more test commands to perform testing of the WEU 300 and at least one other unit of the survey system.

The WEU 300 can transition from the individual active state or group active state to the sleep state in response to either a Wireless_Sleep command or timeout of the wireless connection (indicated by Wireless_Connection_Timeout command) between the WEU 300 and the handheld mobile device 104 (for example, not detecting beacons for a predetermined time duration can be a potential reason for losing connection and therefore connection timeout). The WEU 300 can also transition from the group active state to the individual active state in response to a Wireless_Group_Sleep command, which is sent by the handheld mobile device 104 to cause the WEU 300 to go from a group testing mode to an individual testing mode, in which case the WEU 300 is tested by itself rather than as a group.

When in the individual active state or group active state, if the wireless connection is lost for more than some predefined time duration, the WEU will perform all necessary software or hardware housekeeping functions prior to returning to a low-power mode.

If wireless connectivity is lost while in the group active state, the WEU also triggers a power-down sequence to shut down all other units connected to the WEU before going back to the sleep state. For example, the WEU can broadcast a time-based shutdown command to other units that are connected to the WLU to simultaneously power down to the low-power mode at some predefined time. Such a time-based shut down procedure is possible because the WLUs include real-time clocks that are synchronized with each other.

FIG. 5 is a flow diagram of a process of testing a unit (or group of units) of a survey system. It is assumed that there are multiple WEUs, which in the example of FIG. 5 include WEU1 and WEU2. Both WEU1 and WEU2 power up in a low-power mode (502, 504). In the low-power mode, the wakeup unit 308 (and more particularly, the wireless slave unit 312) of the WEU, as depicted in FIG. 3, enters into a scanning state in which the corresponding wireless slave unit 312 searches for a beacon or other type of wireless signaling from the handheld mobile device 104. The scanning can be performed intermittently to reduce power consumption at the WEU.

When the handheld mobile device 104 moves into proximity of the WEUs, the beacon transmitted (at 506) by the handheld mobile device 104 can be detected by each WEU. This beacon can be transmitted continuously, periodically, or intermittently.

Upon receipt of the wireless beacon, which can contain some type of an identifier of the handheld mobile device 104 (used for authentication), each WEU confirms (508, 510) the identity of the handheld mobile device. Confirmation of the identity of the handheld mobile device 104 is performed for security reasons.

Once confirmed, each WEU responds to the beacon by transmitting (512, 514) the corresponding identity of the respective WEU. The handheld mobile device then verifies (at 516) the identities of the WEUs received at 512, 514. The verification can be based on accessing a database that has been downloaded to the handheld mobile device, for example.

Note that some type of a topology representation or layout plan could also have been downloaded to the mobile handheld device 104. The topology representation or layout plan allows the handheld mobile device 104 to differentiate between different WEUs and enables the handheld mobile device 104 to select from among the WEUs for testing.

Assuming that WEU2 is selected by the handheld mobile device 104 for testing, a handshaking procedure is performed (at 518) to establish a wireless connection between WEU2 and the handheld mobile device 104. Once the wireless connection is established, the handheld mobile device 104 can respond to an operator input or command to send (at 520) a test command (or multiple test commands) to WEU2. The test command(s) can include a Wireless_Individual_Wakeup command, or a Wireless_Group_Wakeup command to place WEU2 into the individual active state or group active state, respectively, followed by commands to perform one or more specific tests at the WEU.

If only individual tests on the connected WEU are desired, then various self-test commands are sent to the WEU. The WEU will respond (at 522) with test results and status messages. However, if a group of units, including the WEU2 are to be tested, then a Wireless_Group_Wakeup command can be sent (at 524) from the handheld mobile device 104 to the WEU2, to cause all other units connected to the WEU2 to wakeup from a low-power mode and to perform testing in response to the test commands. For example, the handheld mobile device 104 can send (at 526) a test command to WEU2, which in turn can send (at 528) a test command to WEU1 (to perform group testing). Each of WEU1 and WEU2 can return (at 530, 532) test responses to the handheld mobile device 104.

The operator can initiate one or more of several types of different tests to different units or to some group of units.

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method of testing at least a first unit of a subterranean survey system, comprising:
  detecting, by the first unit of the subterranean survey system, presence of wireless signaling of a mobile device;
  after the detecting, establishing a wireless connection between the first unit and the mobile device;
  receiving, by the first unit, a wakeup command;
  in response to the wakeup command, transitioning, by the first unit, from a lower power mode to an active mode, wherein the active mode is an individual active mode in response to the wakeup command being of a first type, and the active mode is a group active mode in response to the wakeup command being of a second type; and
  performing a test by the first unit in response to a test command from the mobile device, wherein the test is an individual test of the first unit in response to the first unit being in the individual active mode, and wherein the test is a group test of the first unit and at least another unit in response to the first unit being in the group active mode.

2. The method of claim 1, further comprising transitioning the first unit from the individual or group active mode to the lower power mode in response to lack of wireless signaling activity for greater than a predetermined duration.

3. The method of claim 1, further comprising transitioning the first unit from the individual or group active mode to the lower power mode in response to a sleep command from the mobile device.

4. The method of claim 1, wherein the first unit is part of a segment of the subterranean survey system, and wherein testing of the first unit is performed prior to the segment of the subterranean survey system being connected to a remainder of the subterranean survey system.

5. The method of claim 1, wherein the first unit is a concentrator unit in the subterranean survey system, the method further comprising:
  the concentrator unit routing data in a network of the subterranean survey system.

6. The method of claim 1, wherein the first unit includes a main processing core that is powered off in the lower power mode, wherein the main processing core is powered in the individual or group active mode.

7. The method of claim 6, wherein the first unit further comprises a wakeup unit, the method further comprising:
the wakeup unit awakening the first unit from the lower power mode to the individual or group active mode in response to the wakeup command.

8. The method of claim 1, wherein the first unit further comprises transceivers, the method further comprising:
the transceivers communicating in a network of the subterranean survey system.

9. The method of claim 1, further comprising the first unit, after power up, communicating with at least another unit in the subterranean survey system to build a topology map of a segment of the subterranean survey system.

10. The method of claim 1, further comprising:
the first unit and the at least another unit returning test responses to the mobile device as part of the group test.

11. The method of claim 10, further comprising:
in response to the first unit being in the group active mode, the first unit sending the second type of wakeup command to the at least another unit to awaken the at least another unit from a lower power mode.

12. The method of claim 1, further comprising:
transitioning the first unit between the individual active mode and the group active mode in response to a command from the mobile device.

13. A wireless equipped unit for use in a subterranean survey system, comprising:
a wakeup unit;
a main processing core; and
an antenna connected to the wakeup unit, the antenna to enable the wireless equipped unit to communicate with a mobile device, the wakeup unit configured to:
detect presence of wireless signaling sent by the mobile device, wherein the wireless signaling contains an identifier of the mobile device,
confirm the identifier of the mobile device,
in response to confirming the identifier of the mobile device, transmit an identifier of the wireless equipped unit to the mobile device,
after transmitting the identifier of the wireless equipped unit, establish a wireless connection with the mobile device, and
awaken the wireless equipped unit from a low-power mode to an active mode in response to communication over the wireless connection, wherein the main processing core is powered off in the low-power mode and is powered on in the active mode.

14. The wireless equipped unit of claim 13, wherein the wireless equipped unit is further configured to receive at least one test command from the mobile device to perform a test at the wireless equipped unit.

15. The wireless equipped unit of claim 14, wherein the wakeup unit is configured to:
awaken the wireless equipped unit to an individual active mode in response to receiving a first type of wakeup command, wherein if the wireless equipped unit is in the individual active mode, the test is an individual test of the wireless equipped unit, and
awaken the wireless equipped unit to a group active mode in response to receiving a second type of wakeup command, wherein if the wireless equipped unit is in the group active mode, the test is a group test of the wireless equipped unit and at least another wireless equipped unit.

16. The wireless equipped unit of claim 13, further comprising a power supply that provides a first power supply output for connection to the wakeup unit, and a second power supply voltage for connection to the main processing core, wherein the second power supply output is disconnected from the main processing core in the low-power mode.

17. The wireless equipped unit of claim 13, further comprising transceivers connected to the main processing core, the transceivers to enable the wireless equipped unit to communicate in a network of the subterranean survey system.

18. The wireless equipped unit of claim 17, wherein the transceivers comprise one of optical transceivers and electrical transceivers.

19. The wireless equipped unit of claim 13, wherein the wireless equipped unit is configured to initially power up in the low-power mode.

20. A subterranean survey system apparatus, comprising:
at least one survey sensor to receive signals associated with a subterranean structure; and
at least a first concentrator unit coupled to the at least one survey sensor, the first concentrator unit comprising:
a transceiver to communicate with the at least one survey sensor;
an antenna to communicate wirelessly with a mobile device;
a wakeup unit configured to:
receive a wakeup command,
in response to the wakeup command, transition the first concentrator unit from a lower power mode to an active mode, wherein the active mode is an individual active mode in response to the wakeup command being of a first type and the active mode is a group active mode in response to the wakeup command being of a second type; and
a main processing core configured to respond to a test command sent wirelessly by the mobile device by performing a test of the first concentrator unit, wherein the test is an individual test of the first concentrator unit in response to the first concentrator unit being in the individual active mode, and wherein the test is a group test of the first concentrator unit and at least an other concentrator unit in response to the first concentrator unit being in the group active mode.

21. The subterranean survey system apparatus of claim 20, wherein the first concentrator unit is configured to, responsive to detecting that the first concentrator unit is in the group active mode, send the second type of wakeup command to the at least another concentrator unit to awaken the at least another concentrator unit from a lower power mode.

* * * * *